US008329607B2

(12) United States Patent
Kazi et al.

(10) Patent No.: US 8,329,607 B2
(45) Date of Patent: Dec. 11, 2012

(54) LAYERED DIESEL OXIDATION CATALYST COMPOSITES

(75) Inventors: M. Shahjahan Kazi, Kendall Park, NJ (US); Michel Deeba, East Brunswick, NJ (US); Torsten Neubauer, Langenhagen (DE); Alfred Helmut Punke, Schwuelper (DE); Torsten Wolfgang Mueller-Stach, Hannover (DE); Gerd Grubert, Hannover (DE); Stanley A. Roth, Yardley, PA (US); Jeffrey Barmont Hoke, North Brunswick, NJ (US); Shlang Sung, New York, NY (US); Yuejin Li, Edison, NJ (US); Xinyi Wei, Princeton, NJ (US); Chung-Zong Wan, Somerset, NJ (US)

(73) Assignee: BASF Corporation, Florham Park, NJ (US)

( * ) Notice: Subject to any disclaimer, the term of this patent is extended or adjusted under 35 U.S.C. 154(b) by 155 days.

(21) Appl. No.: 12/687,597

(22) Filed: Jan. 14, 2010

(65) Prior Publication Data

US 2010/0186375 A1    Jul. 29, 2010

Related U.S. Application Data

(60) Provisional application No. 61/145,412, filed on Jan. 16, 2009.

(51) Int. Cl.

| | |
|---|---|
| *B01J 29/06* | (2006.01) |
| *B01J 21/00* | (2006.01) |
| *B01J 29/00* | (2006.01) |
| *B01J 23/00* | (2006.01) |
| *B01J 23/42* | (2006.01) |
| *B01J 23/44* | (2006.01) |
| *B01J 8/02* | (2006.01) |
| *B01D 53/56* | (2006.01) |
| *B01D 53/94* | (2006.01) |
| *B01D 50/00* | (2006.01) |
| *B01D 53/34* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |

(52) U.S. Cl. ............. 502/66; 502/71; 502/74; 502/77; 502/325; 502/339; 502/517; 502/527.15; 423/213.2; 423/213.5; 423/213.7; 422/180

(58) Field of Classification Search ............ 502/66, 502/71, 74, 77, 325, 339, 517, 527.15; 423/213.2, 423/213.5, 213.7

See application file for complete search history.

(56) References Cited

U.S. PATENT DOCUMENTS

| | | | |
|---|---|---|---|
| 4,329,162 A | 5/1982 | Pitcher, Jr. | |
| 4,335,023 A | 6/1982 | Dettling et al. | |
| 4,929,581 A | 5/1990 | Steinwandel et al. | |
| 4,961,917 A | 10/1990 | Byrne | |
| 5,125,231 A | 6/1992 | Patil et al. | |
| 5,202,299 A | 4/1993 | Symons et al. | |
| 5,407,880 A | 4/1995 | Ikeda et al. | |
| 5,462,907 A | 10/1995 | Farrauto et al. | |
| 5,491,120 A | 2/1996 | Voss et al. | |
| 5,516,497 A | 5/1996 | Speronello et al. | |
| 5,531,972 A | 7/1996 | Rudy | |
| 5,627,124 A | 5/1997 | Farrauto et al. | |
| 5,772,972 A | 6/1998 | Hepburn et al. | |
| 6,047,544 A | 4/2000 | Yamamoto et al. | |
| 6,074,973 A * | 6/2000 | Lampert et al. | 502/60 |
| 6,080,375 A * | 6/2000 | Mussmann et al. | 423/213.5 |
| 6,093,378 A | 7/2000 | Deeba et al. | |
| 6,110,862 A | 8/2000 | Chen et al. | |
| 6,171,556 B1 | 1/2001 | Burk et al. | |
| 6,274,107 B1 | 8/2001 | Yavuz et al. | |
| 6,444,610 B1 | 9/2002 | Yamamoto | |
| 6,471,924 B1 | 10/2002 | Feeley et al. | |
| 6,667,018 B2 | 12/2003 | Noda et al. | |
| 6,677,264 B1 | 1/2004 | Klein et al. | |
| 6,708,484 B2 | 3/2004 | Onodera et al. | |
| 6,767,855 B2 * | 7/2004 | Kasahara et al. | 502/66 |
| 7,189,376 B2 | 3/2007 | Kumar et al. | |
| 7,246,488 B2 | 7/2007 | Takaya et al. | |
| 7,250,385 B1 | 7/2007 | Ohno et al. | |
| 7,947,238 B2 * | 5/2011 | Deeba | 423/213.2 |
| 8,211,392 B2 * | 7/2012 | Grubert et al. | 423/213.2 |
| 2003/0061860 A1 | 4/2003 | Hu et al. | |
| 2007/0191219 A1 | 8/2007 | Fujita et al. | |
| 2008/0045405 A1 | 2/2008 | Beutel et al. | |
| 2008/0219906 A1 | 9/2008 | Chen et al. | |

FOREIGN PATENT DOCUMENTS

| | | |
|---|---|---|
| EP | 0782880 A1 | 7/1997 |
| WO | WO-2008/042084 A1 | 4/2008 |
| WO | 2010/083357 * | 7/2010 |

\* cited by examiner

*Primary Examiner* — Patricia L Hailey

(74) *Attorney, Agent, or Firm* — Melanie L. Brown

(57) ABSTRACT

Provided are diesel exhaust components where palladium is segregated from a molecular sieve, specifically a zeolite, in a catalytic material. In the catalytic material, therefore, there are at least two layers: a palladium-containing layer that is substantially free of a molecular sieve and a hydrocarbon trap layer that comprises at least one molecular sieve and is substantially free of palladium. The palladium is provided on a high surface area, porous refractory metal oxide support. The catalytic material can further comprise a platinum component, where a minor amount of the platinum component is in the hydrocarbon trap layer, and a majority amount of the platinum component is in the palladium-containing layer. Systems and methods of using the same are also provided.

18 Claims, No Drawings

LAYERED DIESEL OXIDATION CATALYST COMPOSITES

CROSS REFERENCE TO RELATED APPLICATIONS

This application claims the benefit of priority under 35 U.S.C. §119(e) to U.S. Provisional Application Ser. No. 61/145,412, filed Jan. 16, 2009, which is incorporated herein by reference.

TECHNICAL FIELD

This pertains generally to layered catalysts used to treat gaseous steams containing hydrocarbons, carbon monoxide, and oxides of nitrogen. More specifically, this invention is directed to diesel oxidation catalyst composites having multiple layers, for example, two or more layers of material, one layer that contains palladium and one layer that contains a hydrocarbon trapping material such as a zeolite. The catalytic material can further comprise a platinum component, where a minor amount of the platinum component is in the hydrocarbon trap layer, and a majority amount of the platinum component is in the palladium-containing layer.

BACKGROUND

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Emissions of diesel engines include particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others.

There are major differences between catalyst systems used to treat diesel engine exhaust gas and gasoline engine exhaust gas. A significant difference between the two types of engines is that gasoline engines are spark ignited and operate within a stoichiometric air to fuel ratio, and diesel engines are compression ignition engines that operate with a large excess of air. The emissions from these two types of engines are very different and require completely different catalyst strategies. Generally, the treatment of diesel emissions is more complicated than gasoline engine emissions treatment. In particular, gasoline engines produce exhaust in which the soluble organic fraction (SOF) is lower. The SOFs in diesel emissions is a combination of unburned diesel fuel and lubricating oils.

For diesel engines traditionally, platinum-based DOC catalysts have been used. It is also known that hydrocarbon trapping materials such as zeolites are effective for treating diesel exhaust. For example, U.S. Pat. No. 6,093,378 (Deeba) is directed to a diesel exhaust catalyst, providing two or more zeolites and a supported precious metal component, such as platinum. A first zeolite is provided in the substantial absence of precious metals and a second zeolite is doped with a precious metal. In this way, the first zeolite adsorbs gaseous hydrocarbons and the second zeolite catalyzes the $NO_x$ reduction.

Palladium, however, has proven to be suitable in DOC catalysts in conjunction with platinum to reduce the required amount of platinum, despite it being somewhat less reactive on a weight basis. Due to the lower reactivity of palladium in DOC catalysts, it is important to ensure that it is located in the DOC catalyst in a way that does not inhibit its performance.

As emissions regulations become more stringent, there is a continuing goal to develop diesel oxidation catalyst (DOC) systems that provide improved performance, for example, light-off performance. There is also a goal to utilize components of DOCs, for example, the zeolites and palladium, as efficiently as possible.

SUMMARY

Provided are exhaust systems and components and methods of using the same that use a diesel oxidation catalytic material on a support. The support can be a flow-through design used for a diesel oxidation catalyst (DOC) or wall-flow design used for a catalyzed soot filter (CSF). In an aspect, provided is a layered diesel oxidation catalyst composite comprising: a diesel oxidation catalytic material on a carrier, the catalytic material comprising a palladium component in an amount in the range of 5 to 75 g/ft$^3$ (0.18 to 2.65 kg/m$^3$) and at least two layers:
 a hydrocarbon trap layer comprising at least one molecular sieve, the hydrocarbon trap layer being substantially free of palladium; and
 a palladium-containing layer that comprises the palladium component, and is substantially free of a molecular sieve, wherein the palladium component is located on a high surface area, porous refractory metal oxide support.

Another aspect provides a method of treating a gaseous exhaust stream of a diesel engine, the exhaust stream including hydrocarbons, carbon monoxide, and other exhaust gas components, the method comprising: contacting the exhaust stream with the layered diesel oxidation catalyst composites according to embodiments of the present invention. Other methods can further include directing the diesel exhaust gas stream one or more to a soot filter located downstream of the diesel oxidation catalyst composite and a selective catalytic reduction (SCR) catalytic article located upstream or downstream of the catalyzed soot filter (CSF).

A further aspect provides a system for treatment of a diesel engine exhaust stream including hydrocarbons, carbon monoxide, and other exhaust gas components, the emission treatment system comprising: an exhaust conduit in fluid communication with the diesel engine via an exhaust manifold; the diesel oxidation catalyst composite according to embodiments of the present invention wherein the carrier is a flow through substrate or a wall-flow substrate; and one or more of the following in fluid communication with the composite: a soot filter, a selective catalytic reduction (SCR) catalytic article and a NOx storage and reduction (NSR) catalytic article.

DETAILED DESCRIPTION

Provided are diesel exhaust systems and components where palladium is segregated from a zeolite in a catalytic material. In the catalytic material, therefore, there are at least two layers: a palladium-containing layer that is substantially free of zeolites and a hydrocarbon trap layer that comprises at least one zeolite and is substantially free of palladium. Separating the palladium from the zeolite is intended to enhance effectiveness of the palladium and minimize the loss in CO and HC light-off activity due to possible silica poisoning of precious metals (i.e., palladium) or precious metal (e.g., palladium) migration to the zeolite surface. It has been found that the removal of palladium from the zeolite-containing layer provides excellent light-off performance. It is also advantageous to separate almost all (e.g., >80%, 85%, 90%, or even 95%) of the precious metal components from the zeolite. In addition, the use of a porous high surface area refractory metal oxide support for the palladium and platinum in the absence of a zeolite also provides excellent light-off performance. The use of a high surface area, refractory metal oxide support (substantially free of precious metals) in an underlayer also leads to improvements in light-off at high conversions.

Such catalysts are effective to oxidize hydrocarbons (HC) and carbon monoxide (CO) emitted from a diesel engine, the zeolite of the hydrocarbon trap layer being active for adsorbing HC under conditions associated with diesel engine and the precious metals such a platinum and palladium being active for oxidation of the HC and CO of the diesel exhaust.

Reference to a catalyst composite means a catalytic article including a carrier substrate, for example a honeycomb substrate, having one or more washcoat layers containing a catalytic component, for example, a precious metal component that is effective to catalyze the oxidation of HC, CO and/or $NO_x$.

Reference to "essentially no," "essentially free," and "substantially free" means that the material recited is not intentionally provided in the recited layer. It is recognized, however, that the material may migrate or diffuse to the recited layer in minor amounts considered to be insubstantial (that is <10% of the material, 9%, 8%, 7%, 6%, 5%, 4%, 3%, 2%, or even 1%).

High surface refractory metal oxide supports refer to support particles having pores larger than 20 Å and a wide pore distribution. As defined herein, such metal oxide supports exclude molecular sieves, specifically, zeolites. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Desirably, the active alumina has a specific surface area of 60 to 350 $m^2/g$, and typically 90 to 250 $m^2$ g. The loading on the refractory oxide support is preferably from about 0.1 to about 6 $g/in^3$, more preferably from about 2 to about 5 $g/in^3$ and most preferably from about 3 to about 4 $g/in^3$.

As used herein, molecular sieves, such as zeolites, refer to materials, which may in particulate form support catalytic precious metals, the materials having a substantially uniform pore distribution, with the average pore size being no larger than 20 Å. Reference to a "non-zeolite-support" in a catalyst layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides. One or more embodiments of the present invention include a high surface area refractory metal oxide support comprising an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

The zeolite can be a natural or synthetic zeolite such as faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO5 zeolite, offretite, or a beta zeolite. Preferred zeolite adsorbent materials have a high silica to alumina ratio. The zeolite may have a silica/alumina molar ratio of from at least about 25/1, preferably at least about 50/1, with useful ranges of from about 25/1 to 1000/1, 50/1 to 500/1 as well as about 25/1 to 300/1, from about 100/1 to 250/1, or alternatively from about 35/1 to 180/1 is also exemplified. Preferred zeolites include ZSM, Y and beta zeolites. A particularly preferred adsorbent may comprise a beta zeolite of the type disclosed in U.S. Pat. No. 6,171,556. The zeolite loading should not be smaller than 0.1 $g/in^3$ in order to guarantee sufficient HC storage capacity and to prevent a premature release of stored paraffins during the temperature ramp following low temperature storage. Preferably, zeolite content is in the range of about 0.4 to about 0.7 $g/in^3$. A premature release of aromatics and paraffins from the zeolite may cause a delay in the CO and HC light-off Reference to "impregnated" means that a precious metal-containing solution is put into pores of a material such as a zeolite or a non-zeolite-support. In detailed embodiments, impregnation of precious metals is achieved by incipient wetness, where a volume of diluted precious metal-containing is approximately equal to the pore volume of the support bodies. Incipient wetness impregnation generally leads to a substantially uniform distribution of the solution of the precursor throughout the pore system of the material. Other methods of adding precious metal are also known in the art and can be used.

Reference to OSC (oxygen storage component) refers to an entity that has multi-valence state and can actively store and release oxygen under exhaust conditions. Typically, an oxygen storage component will comprise one or more reducible oxides of one or more rare earth metals. Examples of suitable oxygen storage components include ceria. Praseodymia can also be included as an OSC or a promoter.

Details of the components of a gas treatment article and system according to embodiments of the invention are provided below.

The Carrier

According to one or more embodiments, the carrier may be any of those materials typically used for preparing DOC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc.

The porous wall flow filter used according to the present invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or within the wall itself may consist all, or in part, of the catalytic material. In another embodiment, this invention may include the use of one or more washcoat layers of catalytic materials and combinations of one or more layers of catalytic materials on the inlet and/or outlet walls of the element.

Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Flow-through substrates typically have a wall thickness between 0.002 and 0.1 inches. Preferred flow-through substrates have a wall thickness of between 0.002 and 0.015 inches.

The ceramic carrier may be made of any suitable refractory material, e.g., cordierite, cordierite-α alumina, silicon nitride, silicon carbide, zircon mullite, spodumene, alumina-silica magnesia, zircon silicate, sillimanite, magnesium silicates, zircon, petalite, α-alumina, aluminosilicates and the like.

The carriers useful for the layered catalyst composites of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

For a catalyzed soot filter, the substrate may be a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces.

Preferred wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 40% (e.g., from 40 to 70%) having a mean pore size of at least 5 microns (e.g., from 5 to 30 microns). More preferably, the substrates have a porosity of at least 50% and have a mean pore size of at least 10 microns. When substrates with these porosities and these mean pore sizes are coated with the techniques described below, adequate levels of the CSF catalyst compositions can be loaded onto the substrates to achieve excellent NOx conversion efficiency and burning off of soot. These substrates are still able to retain adequate exhaust flow characteristics, i.e., acceptable back pressures, despite the CSF catalyst loading. Suitable wall flow substrates are for example disclosed in U.S. Pat. No. 4,329,162.

Preparation of Catalyst Composites

The catalyst composites of the present invention may be formed in a single layer or multiple layers. In some instances, it may be suitable to prepare one slurry of catalytic material and use this slurry to form multiple layers on the carrier. The composites can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage therethrough of the gas stream being treated.

The catalyst composite can be readily prepared in layers on a monolithic carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$ per dip. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 400-600° C. for about 10 minutes to about 3 hours. Typically, when palladium is desired, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or tetraammine palladium nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds or stabilizers, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt %, more particularly about 30-40 wt %.

Additional layers, i.e., second and third layers may be prepared and deposited upon the first layer in the same manner as described above for deposition of the first layer upon the carrier.

Providing coated, multi-zoned catalyst substrates can be done by methods know in the art, for example, as described in U.S. Pat. No. 7,189,376, incorporated herein by reference.

Before describing several exemplary embodiments of the invention, it is to be understood that the invention is not limited to the details of construction or process steps set forth in the following description. The invention is capable of other embodiments and of being practiced in various ways. In the following, preferred designs for the layered catalyst are provided, including such combinations as recited used alone or in unlimited combinations, the uses for which include systems and methods of other aspects of the present invention.

In embodiment 1, provided is a layered diesel oxidation catalyst composite comprising: a diesel oxidation catalytic material on a carrier, the catalytic material comprising a palladium component in an amount in the range of 5 to 75 g/ft$^3$ (0.18 to 2.65 kg/m$^3$) and at least two layers: a hydrocarbon trap layer comprising at least one molecular sieve, the hydrocarbon trap layer being substantially free of palladium; and a palladium-containing layer that comprises the palladium component, and is substantially free of a molecular sieve, wherein the palladium component is located on a high surface area, porous refractory metal oxide support.

In embodiment 2, the catalytic material further comprises a platinum component, in the range of 10 g/ft$^3$ to 150 g/ft$^3$ (0.35 to 5.30 kg/m$^3$), an amount of up to 20% by weight of the platinum component being incorporated into the at least one molecular sieve, and an amount of at least 80% by weight of the platinum component being on the high surface area, porous refractory metal oxide support of the palladium-containing layer.

In embodiment 3, the layered catalyst composite further comprises an undercoat layer.

Any of embodiments 1 to 3 and systems and methods of using the same can have one or more of the following optional design features:

the high surface area, porous refractory metal oxide support comprises a compound that is activated, stabilized, or both selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania;

the high surface area, porous refractory metal oxide support comprises alumina having a pore volume in the range of 0.5 to 1.5 cm$^3$/g and an average pore diameter of at least 75 Å; in a specific embodiment, the average pore diameter is in the range of 75 Å to 150 Å;

the molecular sieve comprises a zeolite that comprises a beta-zeolite, ZSM-5, zeolite-Y or combinations thereof;

the zeolite comprises a silica to alumina ratio in the range of 20:1 to 1000:1;

the layered catalyst composite further comprises an undercoat layer located on the carrier and below the at least two layers, the undercoat layer comprising a high surface area refractory metal oxide;

the high surface area, porous refractory metal oxide support comprises alumina having a surface area in the range of 60 to 200 m$^2$/g, a pore volume in the range of 0.6 to 1.0 cm$^3$/g, and an average pore diameter in the range of 70 Å to 150 Å, and wherein the zeolite comprises a beta zeolite into which the amount of at least 10% by weight of the platinum component is incorporated;

the layered catalyst composite having a total precious metal component loading in an amount in the range of 15 to 225 g/ft$^3$ (0.53 to 7.95 kg/m$^3$);

the platinum to palladium weight ratio of the catalytic material is in the range of 10:1 to 1:10; in a specific embodiment, the platinum to palladium weight ratio of the catalytic material is in the range of 4:1 to 1:1;

the palladium-containing layer is located on the carrier and the hydrocarbon trap layer is located on the palladium-containing layer, or the hydrocarbon trap layer is located on the carrier and the palladium-containing layer is located on the hydrocarbon trap layer;

the hydrocarbon trap layer is substantially free of non-zeolite-supported precious metal components;

the hydrocarbon trap layer is substantially free of oxygen storage components;

the catalytic material is substantially free of base metals in quantities suitable for NOx (nitrogen oxides) storage; such base metals include, but are not limited to, Ba, Mg, K, and La, and the like;

the catalytic material is free of rhodium;

the palladium-containing layer is located on the carrier and the hydrocarbon trap layer is located on the palladium-containing layer the high surface area; and the high surface area, porous refractory metal oxide support comprises alumina having a surface area in the range of 60 to 200 m$^2$/g and a pore volume in the range of 0.6 to 1.0 cm$^3$/g, and the average pore diameter is in the range of 70 Å to 150 Å and the at least one zeolite comprises beta-zeolite; and the catalytic material further comprises a platinum component, an amount of up to 10% by weight of the platinum component being incorporated into the beta-zeolite, and an amount of at least 90% by weight of the platinum component being on the alumina.

EXAMPLES

The following non-limiting examples shall serve to illustrate the various embodiments of the present invention. In each of the examples, the carrier was cordierite. Reference to a first coat and a second coat provides no limitation on the location or orientation of the coat.

Example 1

A composite having a catalytic material was prepared using three layers: an undercoat layer, an inner layer, and an outer layer. The layered catalyst composite contained palladium and platinum with a total precious metal loading of about 120 g/ft$^3$ and with a nominal Pt/Pd/Rh ratio of 2/1/0. The substrate had a volume of 5.3 in$^3$ (0.09 L), a cell density of 400 cells per square inch, and a wall thickness of approximately 100 μm. The layers were prepared as follows:

Undercoat Layer

The component present in the undercoat layer was 100% high surface area (70 m²/g) gamma alumina. The total loading of the undercoat layer was 1.0 g/in³.

An aqueous slurry was formed by combining the gamma alumina with water (45-50% solids slurry) and acetic acid to pH<4.5 and milling to a particle size of 90% less than 8 microns. The slurry was coated onto a cordierite carrier using deposition methods known in the art for depositing the catalyst on a cordierite substrate. After coating, the carrier plus the undercoat layer were dried and then calcined at a temperature of 450° C. for about 1 hour.

Inner Layer

The components present in the inner layer were high surface area (80 m²/g) gamma alumina, platinum, and palladium, at concentrations of approximately 95.1%, 3.2%, and 1.7%, respectively, based on the calcined weight of the catalyst. The total loading of the middle layer was 1.4 g/in³. The inner layer contained 100% of the palladium and approximately 90% of the platinum loadings. The gamma alumina had a single point adsorption total pore volume in the range of 0.59-0.71 cm³/g and an average BET pore diameter in the range of 319-350 Å.

Palladium in the form of a palladium nitrate solution and platinum in the form of an amine salt were impregnated onto the gamma alumina by planetary mixer (P-mixer) to form a wet powder while achieving incipient wetness. An aqueous slurry was then formed, using an acid to reduce the pH to <4.5. The slurry was milled to a particle size of 90% less than 10 microns. The slurry was coated onto the cordierite carrier over the inner layer using deposition methods known in the art for depositing the catalyst on a cordierite substrate. After coating, the carrier plus the undercoat and inner layers were dried, and then calcined at a temperature of 450° C. for about 1 hour.

Outer Layer

The components present in the outer layer were a high surface area gamma alumina, H-beta zeolite, 0.6% Pt-beta zeolite, a binder, at concentrations of approximately 32.3%, 25.8%, 38.7%, and 3.2%, respectively, based on the calcined weight of the catalyst. The total loading of the outer layer was 0.8 g/in³.

An aqueous slurry of the gamma alumina was formed, using an acid to reduce the pH to <4.5. The slurry was milled to a particle size of 90% less than 16 microns. The H-beta zeolite and the Pt-beta zeolite were added to the slurry. The slurry was then milled to a particle size of 90% less than 10 microns. The binder was added to the slurry. The slurry was coated onto the cordierite carrier over the middle layer using deposition methods known in the art for depositing the catalyst on a cordierite substrate. After coating, the carrier plus the undercoat, inner, and outer layers were dried, and then calcined at a temperature of 450° C. for about 1 hour.

Example 2

A composite having a catalytic material was prepared using two layers: an inner layer and an outer layer. The layered catalyst composite contained palladium and platinum with a total precious metal loading of about 120 g/ft³ and with a nominal Pt/Pd/Rh ratio of 2/1/0. The substrate had a volume of 5.3 in³ (0.09 L), a cell density of 400 cells per square inch, and a wall thickness of approximately 100 μm. The inner layer was prepared with the same components, amounts, and methods as the inner layer of Example 1. The outer layer was prepared with the same components and amounts as the outer layer of Example 1.

Example 3

Comparative

A comparative composite having a catalytic material was prepared using two layers: an inner layer and an outer layer. The layered catalyst composite contained palladium and platinum with a total precious metal loading of about 120 g/ft³ and with a nominal Pt/Pd/Rh ratio of 2/1/0. The layers were prepared as follows:

Inner Layer

The components present in the inner layer were high surface area (70 m²/g) gamma alumina, promoters, and precious metals of platinum and palladium being present in the layer in the amount of 60 g/ft³ and with a nominal Pt/Pd ratio of 7/5. The gamma alumina had a single point adsorption total pore volume of about 0.4 cm³/g and an average BET pore diameter of about 74 Å.

Palladium in the form of a palladium nitrate solution and platinum in the form of an amine salt were impregnated onto the gamma alumina by planetary mixer (P-mixer) to form a wet powder while achieving incipient wetness. An aqueous slurry was then formed, using an acid to reduce the pH. The slurry was milled to a particle size of 90% less than approximately 10 microns. The slurry was coated onto the cordierite carrier using deposition methods known in the art for depositing the catalyst on a cordierite substrate. After coating, the carrier plus the inner layer were dried, and then calcined.

Outer Layer

The components present in the outer layer were high surface area (100 m²/g) gamma alumina, beta-zeolite, and a promoter, and precious metals of platinum and palladium being present in the layer in the amount of 60 g/ft³ and with a nominal Pt/Pd ratio of 3/1. The precious metals were supported on the gamma alumina. The gamma alumina had a single point adsorption total pore volume of about 0.4 cm³/g and an average BET pore diameter in the range of 150-171 Å.

Palladium in the form of a palladium nitrate solution and platinum in the form of an amine salt were impregnated onto the gamma alumina by planetary mixer (P-mixer) to form a wet powder while achieving incipient wetness. An aqueous slurry was then formed, using an acid to reduce the pH. The slurry was milled to a particle size of 90% less than approximately 10 microns. The beta-zeolite and promoter were added to the slurry. The slurry was coated onto the cordierite carrier over the inner layer using deposition methods known in the art for depositing the catalyst on a cordierite substrate. After coating, the carrier plus the inner and outer layers were dried, and then calcined.

Example 4

Testing

The composites of Examples 1-3 were tested as follows. Catalyst composites of size 1.5"×3.0" (3.8 cm×7.6 cm) were aged with laboratory oven aging at approximately 750° C. for 5 hours in 10% steam air. After aging, the composites were evaluated for light-off using a laboratory reactor system. The light-off testing protocol included a test gas composition of 1500 ppm CO, 400 ppm $C_1$ (134 ppm $C_3H_6$, 133 ppm $C_7H_8$, n-$C_{10}H_{22}$), 10% $O_2$, 100 ppm NO, 5% $CO_2$, and 7% $H_2O$. The ramp rate was 15° C./min. The space velocity was 50,000 $h^{-1}$. There was no initial soak in the reaction gas feed.

HC/CO conversions were measured while the temperature was rapidly raised from 80° C. to 325° C. CO concentration was measured using a Fourier Transform Infrared (FTIR) analyzer. Total hydrocarbons (THC) were measured using an FID. The temperature at which 50% conversion of CO and THC occurred is reported in Table 1.

TABLE 1

| | HC, °C. | CO, °C. |
|---|---|---|
| Example 1 | 157 | 156 |
| Example 2 | 153 | 154 |
| Example 3 COMPARATIVE | 170 | 177 |

Light-off test results clearly indicated the benefits of using catalyst having palladium separated from the zeolite layer and having a porous alumina in the inner layer supporting the precious metal components.

Example 5

The effect of the porosity on catalyst support materials was evaluated. Light-off testing was done on single coated supports formed in accordance with methods set forth herein in "Preparation of Catalyst Composites" from washcoats containing high porosity alumina powders at loadings of 1 g/in$^3$ and precious metals of platinum and palladium having a Pt:Pd ratio of 2:1 at loadings of 60 g/ft$^3$. The high porosity alumina of Sample 5A show a 25° C. light-off advantage as compared to a lower porosity alumina of Sample 5B (comparative) as shown in Table 2.

TABLE 2

| Sample | Alumina Surface Area (m2/g) | Alumina Total Pore Volume (cm$^3$/g) | Alumina Mean Pore Size (diameter) Å | CO Light-Off (T50, ° C.) |
|---|---|---|---|---|
| 5A | 148 | 0.85 | 99 | 179 |
| 5B COMPARATIVE | 143 | 0.47 | 50 | 204 |

Example 6

The effect of segregating palladium and most of the platinum from the zeolite was evaluated. Carbon monoxide conversion was evaluated for 3 catalysts using a EURO 4, 2.0 L test vehicle during the NEDC test after 750° C./24 hours, engine aging. The catalysts had the following compositions and structures and provided the recited CO conversion efficiency, as shown in Table 3:

TABLE 3

| Sample | Bottom layer | Top layer | % CO Conversion Efficiency |
|---|---|---|---|
| 6A | Pt-impregnated H-beta zeolite (5 g/ft$^3$ (0.18 kg/m$^3$) Pt) | Pt— and Pd— impregnated γ-Al$_2$O$_3$ (40 g/ft$^3$ (1.41 kg/m$^3$) Pd) (115 g/ft$^3$ (4.06 kg/m$^3$) Pt) | 35 |
| 6B | Pt— and Pd— impregnated γ-Al$_2$O$_3$ (40 g/ft$^3$ (1.41 kg/m$^3$) Pd) (115 g/ft$^3$ (4.06 kg/m$^3$) Pt) | Pt-impregnated H-beta zeolite (5 g/ft$^3$ (0.18 kg/m$^3$) Pt) | 41 |
| | | Single Layer | |
| 6C COMPARATIVE | Blend of Pt— and Pd— impregnated γ-Al$_2$O$_3$ (40 g/ft$^3$ (1.41 kg/m$^3$) Pd) with Pt-impregnated H-beta zeolite (5 g/ft$^3$ (0.18 kg/m$^3$) Pt) (115 g/ft$^3$ (4.06 kg/m$^3$) Pt | | 30 |

Samples 6A and 6B that segregated palladium and most of the platinum from the zeolite showed improved CO conversion as compared to Sample 6C, which had a single layer of catalyst having the same overall composition as Samples 6A and 6B.

Example 7

A composite having a catalytic material was prepared using three layers: an undercoat layer, an inner layer, and an outer layer. The layered catalyst composite contained palladium and platinum with a total precious metal loading of about 120 g/ft$^3$ and with a nominal Pt/Pd/Rh ratio of 2/1/0. The substrate had a volume of 75.5 in$^3$ (1.24 L), a cell density of 400 cells per square inch, and a wall thickness of approximately 6 µm. The layers were prepared as follows:

Undercoat Layer

The component present in the undercoat layer was 100% high surface area (70 m$^2$/g) gamma alumina. The total loading of the undercoat layer was 1.0 g/in$^3$.

An aqueous slurry was formed by combining the gamma alumina with water (45-50% solids slurry) and an acid to pH <4.5 and milling to a particle size of 90% less than 10 microns. The slurry was coated onto a cordierite carrier using deposition methods known in the art for depositing the catalyst on a cordierite substrate. After coating, the carrier plus the undercoat layer were dried and then calcined at a temperature of 450° C. for about 1 hour.

Inner Layer

The components present in the inner layer were high surface area (160 m$^2$/g) gamma alumina, platinum, palladium, and a stabilizer. The total loading of the middle layer was 1.6 g/in$^3$. The inner layer contained 100% of the palladium and about 90% of the platinum loadings. The gamma alumina had a single point adsorption total pore volume in the range of about 0.85 cm$^3$/g and an average BET pore diameter of about 100 Å.

Palladium and platinum in the form of soluble salts were impregnated onto the gamma alumina by planetary mixer (P-mixer) to form a wet powder while achieving incipient wetness. An aqueous slurry was then formed, using an acid to reduce the pH to <4.5. The slurry was milled to a particle size of 90% less than 10 microns. The slurry was coated onto the cordierite carrier over the undercoat layer using deposition methods known in the art for depositing the catalyst on a cordierite substrate. After coating, the carrier plus the undercoat and inner layers were dried, and then calcined at a temperature of 450° C. for about 1 hour.

Outer Layer

The components present in the outer layer were a high surface area (160 m²/g) gamma alumina, H-beta zeolite, and platinum. The total loading of the outer layer was 0.8 g/in³.

An aqueous slurry of the gamma alumina was formed, using an acid to reduce the pH to <4.5. The slurry was milled to a particle size of 90% less than 10 microns. A soluble salt of platinum was used to impregnate the H-beta zeolite, which was added to the slurry. The slurry was then milled to a particle size of 90% less than 10 microns. The slurry was coated onto the cordierite carrier over the inner layer using deposition methods known in the art for depositing the catalyst on a cordierite substrate. After coating, the carrier plus the undercoat, inner, and outer layers were dried, and then calcined at a temperature of 450° C. for about 1 hour.

Example 8

Testing

The catalytic materials of Examples 3 and 7 were coated onto 75 in³ (1.24 L) substrates and were evaluated for engine light-off performance. HC/CO conversions were measured while the temperature was rapidly raised from 80° C. to 325° C. CO concentration was measured using a Fourier Transform Infrared (FTIR) analyzer. Total hydrocarbons (THC) were measured using an FID. The conversion efficiencies, $T_{50}$ for CO (temperature at which 50% of CO was converted), $T_{70}$ for HC (temperature at which 70% of HCs were converted), and are reported in Table 4. Table 4 shows that the layered catalyst of Example 7 provided an improvement of 18° C. for hydrocarbon conversion at 70% and of 31° C. for carbon monoxide conversion at 50%.

TABLE 4

| | HC, $T_{70}$ ° C. | CO, $T_{50}$ ° C. |
|---|---|---|
| Example 7 | 202 | 180 |
| Example 3 COMPARATIVE | 220 | 211 |

Layered catalysts of Examples 3 and 7 were tested on EURO 4-type vehicles having 2 different engine sizes: a 1.5 L engine and a 2 L engine. The conversion efficiencies for CO and HC measured on the regulated European NEDC drive cycle and are reported in Table 5.

TABLE 5

| | Engine Size | CO Conversion Efficiency (%) | HC Conversion Efficiency (%) |
|---|---|---|---|
| Example 7 | 1.5 L | 69 | 76 |
| Example 3 COMPARATIVE | 1.5 L | 46 | 64 |
| Example 7 | 2 L | 71 | 77 |
| Example 3 COMPARATIVE | 2 L | 48 | 65 |

These vehicle conversion test results in Table 5 clearly indicated the benefits of using a catalyst having palladium separated from the zeolite layer and having a porous alumina in the inner layer supporting the precious metal components. For CO, conversion efficiency improved by 23 percentage points and for HC, conversion efficiency improved by 12 percentage points.

Example 9

A catalyzed soot filter (CSF) having a catalytic material is prepared using three layers: an undercoat layer, an inner layer, and an outer layer. The CSF contains palladium and platinum with a total PGM loading of 25 g/ft³ and a nominal Pt/Pd/Rh ratio of 2/1/0. The layers contain compositions in accordance with one or more of Examples 1, 3, and 7 at loadings sufficient to convert CO and HCs without deleterious effects on back pressure.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. A layered diesel oxidation catalyst composite comprising:
a diesel oxidation catalytic material on a carrier, the catalytic material comprising a palladium component in an amount in the range of 5 to 75 g/ft³ (0.18 to 2.65 kg/m³) and at least two layers:
a hydrocarbon trap layer comprising at least one molecular sieve, the hydrocarbon trap layer being substantially free of palladium; and
a palladium-containing layer that comprises the palladium component, and is substantially free of a molecular sieve, wherein the palladium component is located on a high surface area, porous refractory metal oxide support, wherein the high surface area, porous refractory metal oxide support comprises alumina having a pore volume in the range of 0.5 to 1.5 cm³/g and an average pore diameter of at least 75 Å.

2. The layered catalyst composite of claim 1, wherein the catalytic material further comprises a platinum component, in the range of 10 g/ft³ to 150 g/ft³ (0.35 to 5.30 kg/m³), an amount of up to 20% by weight of the platinum component being incorporated into the at least one molecular sieve, and an amount of at least 80% by weight of the platinum component being on the high surface area, porous refractory metal oxide support of the palladium-containing layer.

3. The layered catalyst composite of claim 1, wherein the high surface area, porous refractory metal oxide support comprises a compound that is activated, stabilized, or both selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

4. The layered catalyst composite of claim 1, wherein the average pore diameter in the range of 75 Å to 150 Å.

5. The layered catalyst composite of claim 1, wherein the molecular sieve comprises a zeolite that comprises a beta-zeolite, ZSM-5, zeolite-Y or combinations thereof.

6. The layered catalyst composite of claim 5, wherein the zeolite comprises a silica to alumina ratio in the range of 20:1 to 1000:1.

7. The layered catalyst composite of claim 5, wherein the high surface area, porous refractory metal oxide support comprises alumina having a surface area in the range of 80 to 200 $m^2/g$, a pore volume in the range of 0.6 to 1.0 $cm^3/g$, and an average pore diameter in the range of 70 Å to 150 Å, and wherein the zeolite comprises a beta zeolite into which the amount of at least 10% by weight of the platinum component is incorporated.

8. The layered catalyst composite of claim 1 having a total precious metal component loading in an amount in the range of 15 to 225 $g/ft^3$ (0.53 to 7.95 $kg/m^3$).

9. A method of treating a gaseous exhaust stream of a diesel engine, the exhaust stream including hydrocarbons, carbon monoxide, and other exhaust gas components, the method comprising: contacting the exhaust stream with the diesel oxidation catalyst composites of claim 1.

10. The method of claim 9, wherein the catalytic material further comprises a platinum component, in the range from 10 $g/ft^3$ to 150 $g/ft^3$ (0.35 to 5.30 $kg/m^3$), an amount of up to 10% by weight of the platinum component being incorporated into the at least one molecular sieve, and an amount of at least 90% by weight of the platinum component being on the high surface area, porous refractory metal oxide support of the palladium-containing layer.

11. The method of claim 10, wherein the high surface area, porous refractory metal oxide support comprises alumina having a surface area in the range of 60 to 200 $m^2/g$, a pore volume in the range of 0.6 to 1.0 $cm^3/g$, and an average pore diameter is in the range of 70 Å to 150 Å, and wherein the molecular sieve comprises a zeolite that comprises a beta zeolite into which the amount of at least 10% by weight of the platinum component is incorporated.

12. The method of claim 10, further comprising directing the diesel exhaust gas stream one or more to a soot filter located downstream of the diesel oxidation catalyst composite and a selective catalytic reduction (SCR) catalytic article located upstream or downstream of the catalyzed soot filter (CSF).

13. A system for treatment of a diesel engine exhaust stream including hydrocarbons, carbon monoxide, and other exhaust gas components, the emission treatment system comprising:
  an exhaust conduit in fluid communication with the diesel engine via an exhaust manifold;
  the diesel oxidation catalyst composite of claim 1 wherein the carrier is a flow through substrate or a wall-flow substrate; and
  one or more of the following in fluid communication with the composite: a soot filter, a selective catalytic reduction (SCR) catalytic article and a NOx storage and reduction (NSR) catalytic article.

14. A layered diesel oxidation catalyst composite comprising:
  a diesel oxidation catalytic material on a carrier, the catalytic material comprising a palladium component in an amount in the range of 5 to 75 $g/ft^3$ (0.18 to 2.65 $kg/m^3$) and at least two layers:
  a hydrocarbon trap layer comprising at least one molecular sieve, the hydrocarbon trap layer being substantially free of palladium; and
  an undercoat layer located on the carrier and below the at least two layers, the undercoat layer comprising a high surface area refractory metal oxide.

15. A layered diesel oxidation catalyst composite comprising:
  a diesel oxidation catalytic material on a carrier, the catalytic material comprising a palladium component in an amount in the range of 5 to 75 $g/ft^3$ (0.18 to 2.65 $kg/m^3$) and at least two layers:
  a hydrocarbon trap layer comprising at least one molecular sieve, the hydrocarbon trap layer being substantially free of palladium; and
  a palladium-containing layer that comprises the palladium component, and is substantially free of a molecular sieve, wherein the palladium-containing layer is located on the carrier and the hydrocarbon trap layer is located on the palladium-containing layer.

16. The layered catalyst of claim 15, further comprising an undercoat layer wherein the palladium component in the catalytic material is present in the amount of about 40 $g/ft^3$, the palladium-containing layer comprises 100% of the palladium component in the catalytic material and gamma alumina having a single point adsorption total pore volume about 0.85 $cm^3/g$ and an average BET pore diameter of about 100 Å, wherein the palladium-containing layer further comprises platinum, and the hydrocarbon trap layer comprises beta-zeolite, gamma alumina, and platinum.

17. A layered diesel oxidation catalyst composite comprising:
  a diesel oxidation catalytic material on a carrier, the catalytic material comprising a palladium component in an amount in the range of 5 to 75 $g/ft^3$ (0.18 to 2.65 $kg/m^3$) and at least two layers:
  a hydrocarbon trap layer comprising at least one molecular sieve, the hydrocarbon trap layer being substantially free of palladium; and
  a palladium-containing layer that comprises the palladium component, and is substantially free of a molecular sieve, wherein the palladium component is located on a high surface area, porous refractory metal oxide support, wherein the high surface area, porous refractory metal oxide support comprises alumina having a surface area in the range of 80 to 200 $m^2/g$, a pore volume in the range of 0.5 to 1.0 $cm^3/g$, and an average pore diameter of at least 75 Å, wherein the molecular sieve comprises a zeolite and a platinum component, and wherein the zeolite comprises a beta zeolite into which the amount of at least 10% by weight of the platinum component is incorporated.

18. The layered catalyst of claim 17, wherein the average pore diameter is in the range of 75 Å to 150 Å.

* * * * *